United States Patent
Wier

(10) Patent No.: US 6,994,288 B2
(45) Date of Patent: Feb. 7, 2006

(54) BELT RETRACTOR COMPRISING A TENSIONING DEVICE

(75) Inventor: Franz Wier, Göggingen (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 10/783,180

(22) Filed: Feb. 20, 2004

(65) Prior Publication Data

US 2004/0169105 A1     Sep. 2, 2004

(30) Foreign Application Priority Data

Feb. 28, 2003  (DE) .......................... 203 03 302 U

(51) Int. Cl.
*B65H 75/48*     (2006.01)

(52) U.S. Cl. ..................... 242/374; 280/807; 297/478

(58) Field of Classification Search ................ 242/374; 280/807; 297/478, 475, 476
See application file for complete search history.

(56) References Cited

U.S. PATENT DOCUMENTS

| | | | |
|---|---|---|---|
| 5,397,075 A | * | 3/1995 | Behr .......................... 242/374 |
| 5,641,131 A | | 6/1997 | Schmid et al. |
| 6,149,095 A | * | 11/2000 | Specht et al. ................ 242/374 |
| 6,155,512 A | | 12/2000 | Specht et al. |
| 6,241,173 B1 | * | 6/2001 | Wier .......................... 242/382 |
| 6,299,090 B1 | | 10/2001 | Specht et al. |
| 6,318,662 B1 | | 11/2001 | Hori et al. |
| 6,450,435 B2 | * | 9/2002 | Junker et al. ................ 242/374 |
| 6,698,677 B1 | * | 3/2004 | Happ et al. .................. 242/374 |
| 2001/0040199 A1 | | 11/2001 | Takehara et al |

FOREIGN PATENT DOCUMENTS

| | | |
|---|---|---|
| DE | 4415103 | 4/1995 |
| DE | 19837927 | 3/2000 |
| DE | 19927270 | 1/2001 |
| DE | 10119753 | 11/2001 |
| DE | 20113773 | 6/2002 |
| EP | 0724987 | 8/1996 |

* cited by examiner

*Primary Examiner*—John Q. Nguyen
*Assistant Examiner*—Sang Kim
(74) *Attorney, Agent, or Firm*—Tarolli, Sundheim, Covell & Tummino L.L.P.

(57) ABSTRACT

A belt retractor comprising a tensioning device having a cylinder and a piston displaceably guided in said cylinder, said piston being provided with a tooth rack section into which a pinion can engage to drive said belt retractor, wherein said tooth rack section comprises at least one segment which is detachably attached to said piston.

12 Claims, 8 Drawing Sheets

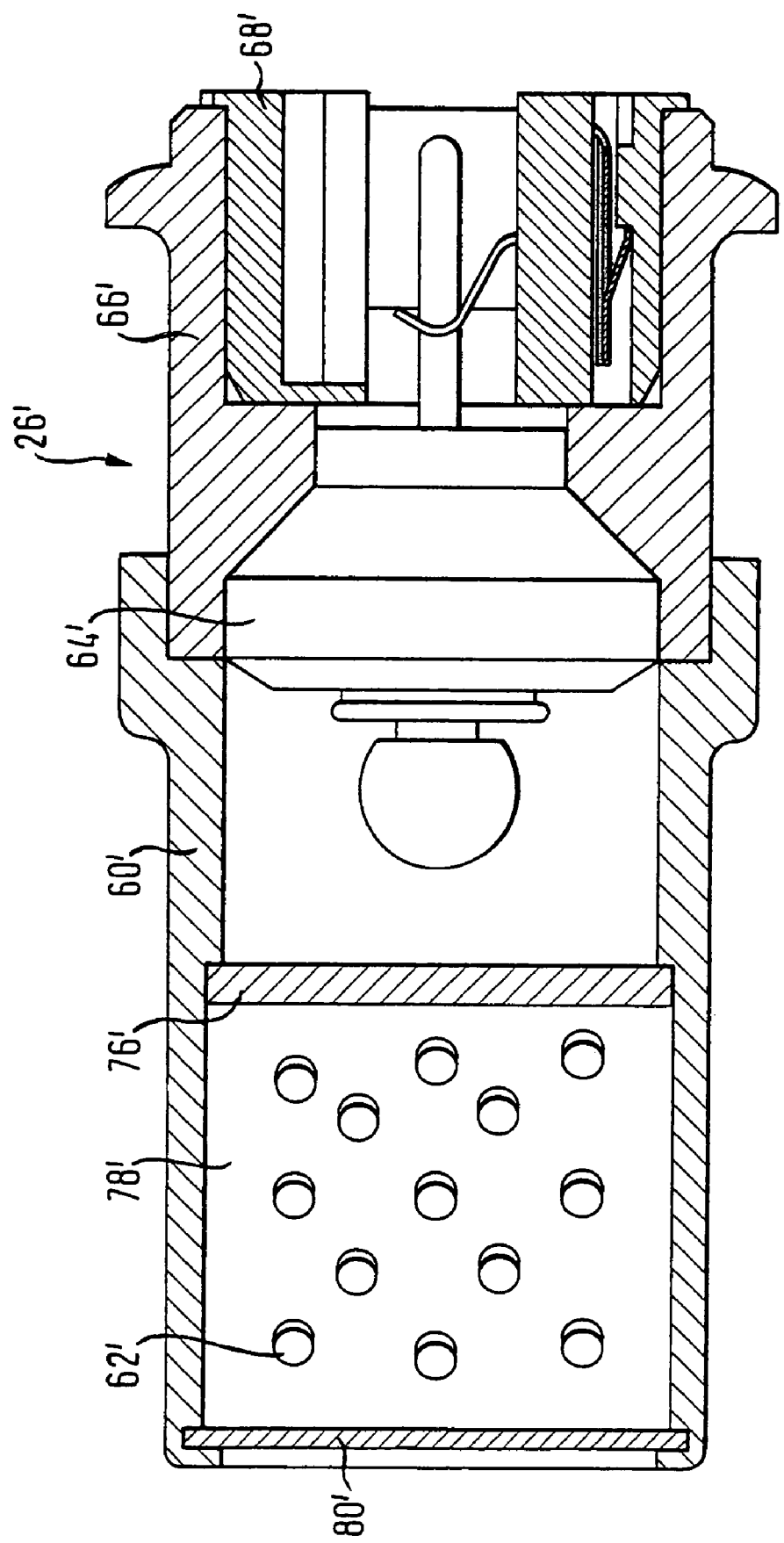

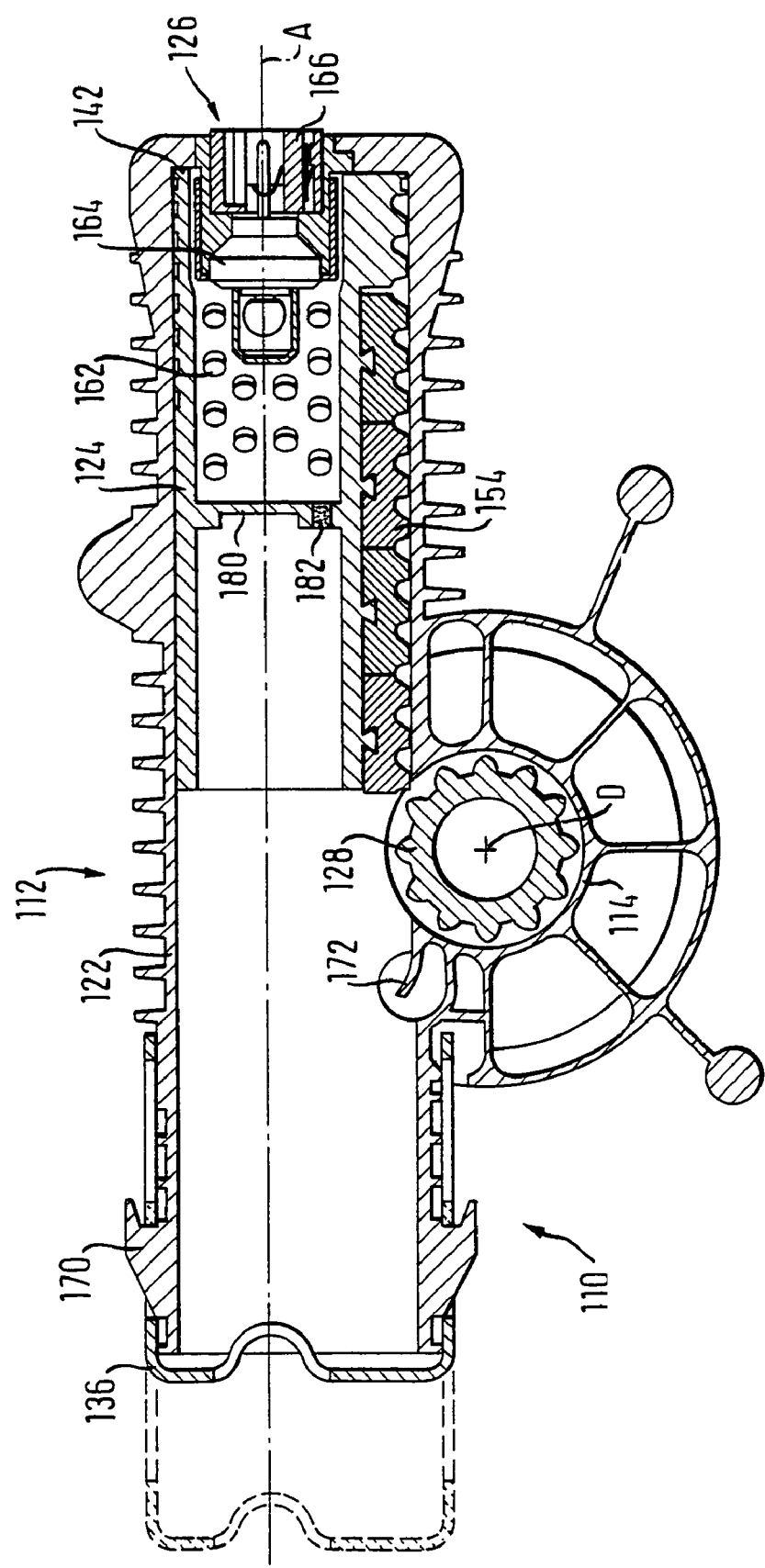

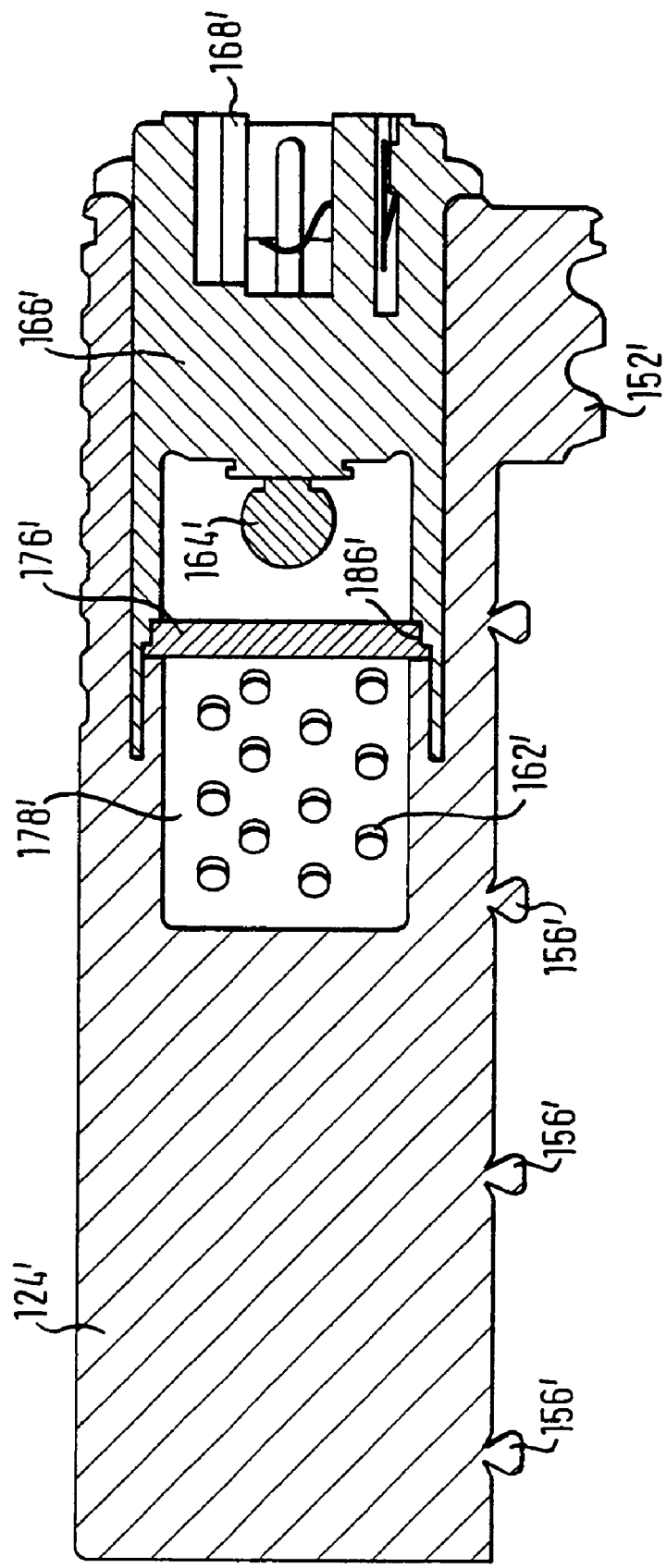

BELT RETRACTOR COMPRISING A TENSIONING DEVICE

The invention relates to a belt retractor for a vehicle seat belt.

BACKGROUND OF THE INVENTION

Conventional belt retractors comprise a tensioning device having a cylinder and a piston slidably guided in the cylinder, the piston being provided with a tooth rack section into which a pinion can engage to drive the belt retractor.

Such a belt retractor is for example known from DE 44 15 103 A1. In case of this belt retractor, the tooth rack is integrated into the outer wall of the piston, so that the tensioning device can be constructed so as to have a very small size. The tooth rack is in engagement with the associated pinion already prior to the activation of the tensioning device and through the entire tensioning length. Therefore, a coupling is required, which connects the pinion to the retractor for the tensioning process and separates it afterwards so as to enable the belt webbing to be unwound from the belt reel. In DE 201 13 773 U1 the piston is provided with a vent valve in case of a belt retractor of the type concerned so as to enable the piston to be displaced again in the direction of its initial position after the tensioning process. This can be necessary, for example, for the function of a belt force limitation.

The invention provides a cost-effective and simple belt retractor comprising a tensioning device.

BRIEF DESCRIPTIONS OF THE INVENTION

For this purpose, it is provided in case of a belt retractor of the aforementioned type that the tooth rack section comprises at least one segment which is detachably attached to the piston. Thus, after the activation of the belt tensioner at least one section of the tooth rack section can be detached from the piston so that this section comes out of engagement with the pinion. The function of the belt retractor is then no longer impeded by the piston. This permits a free running of the belt retractor without a coupling being required between the pinion and the belt reel or a vent valve being necessary in the piston or in the cylinder.

According to a preferred embodiment the tooth rack comprises several segments which are detachable from the piston separately. Thus, a free running function can be achieved with the belt retractor even if the piston has moved through the tensioning length only partially, for example because a force limitation has started.

Further advantageous embodiments will be apparent from the sub-claims.

BRIEF DESCRIPTION OF THE DRAWINGS

The invention will be described in detail in the following with the aid of preferred embodiments. In this connection reference is made to the accompanying drawings, in which:

FIG. 6 shows a longitudinal section through an alternative design of a piston for a belt retractor according to the invention;

FIG. 7 shows a longitudinal section through a belt retractor according to a second embodiment of the invention; and FIG. 8 shows a longitudinal section through an alternative design of a piston for a belt retractor according to the invention.

DETAILED DESCRIPTION OF THE INVENTION

Figure 1:
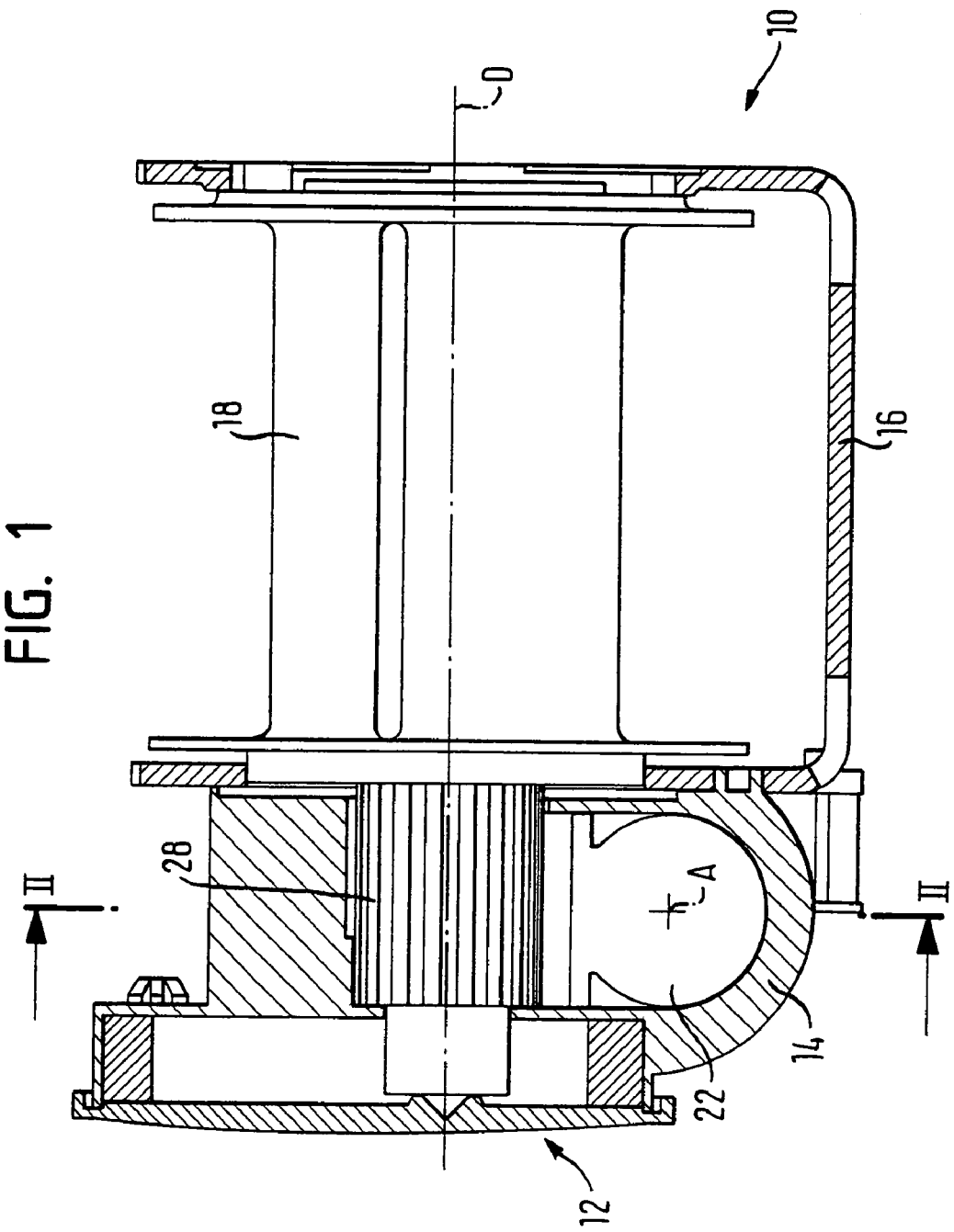
FIG. 1 shows a cross-section through a belt retractor according to a first embodiment of the invention in a first state.
Figure 2:
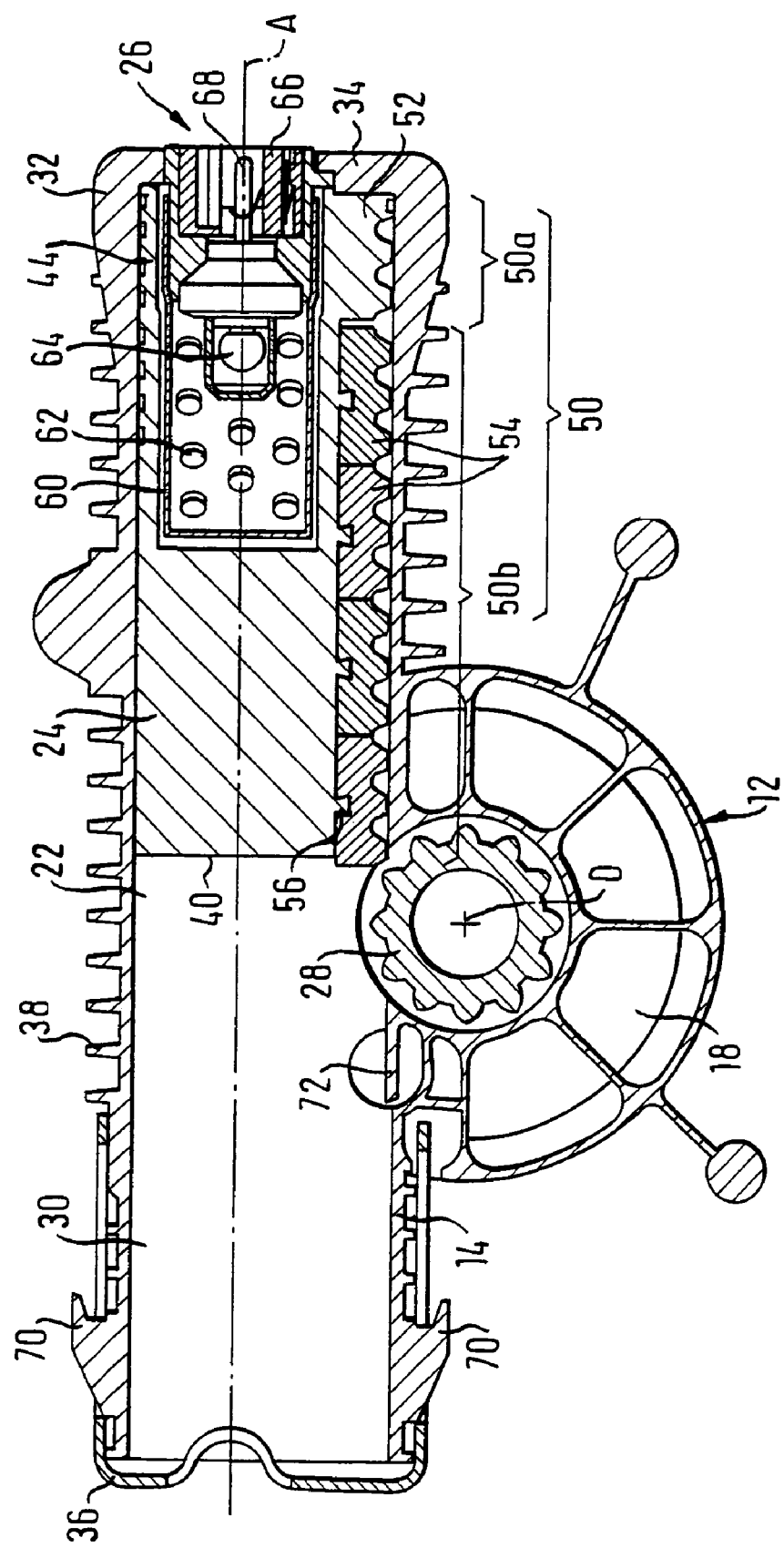
FIG. 2 shows a longitudinal section through the belt retractor of FIG. 1 along the line II—II in FIG. 1.

In FIGS. 1 and 2 a belt retractor 10 comprising a tensioning device 12 can be seen. The belt retractor 10 has a U-shaped frame 16 between the legs of which a belt reel 18 is mounted so as to be rotatable about an axis D. The belt reel 18 is equipped with a pinion 28 projecting through one of the legs of the frame into the area of the tensioning device 12.

In the described embodiment, the tensioning device 12 consists of a housing 14, in which a cylinder 22 having a circular cross-section is formed, a piston 24 being displaceably guided therein, and a gas generator 26 for the generation of pressurized gas to drive the piston 24. The cylinder 22 extends along a longitudinal axis A at right angles relative to the axis of rotation D of the belt reel 18 from a front end 30 (at the left in the Figures) to a rear end 32, at which the cylinder 22 has an end wall 34. At the front end 30 the cylinder 22 is closed with a displaceable catching cap 36 which forms a braking device for the piston 24. Since the gas generator 26 is located at the rear end 32, the wall thickness of the cylinder 22 in this region is configured, as a protection against burning, to be of a greater thickness than in the further course of the cylinder 22 where the wall of the cylinder is relatively thin but is reinforced by longitudinal ribs and transverse ribs 38 of a thickness of preferably 0.5 to 1.5 mm, in order to ensure the necessary stability of the cylinder 22.

The piston 24 consists of a substantially cylindrical body comprising an upper end 40 and a lower end 42 that points to the rear end 32 of the cylinder 22. The cross-section of the piston 24 is adapted to the cross-section of the cylinder 22 so that the piston 24 can slide in the cylinder 22 in a tight manner. At the lower end 42 the piston 24 has a tube section 44 surrounding a propelling chamber 46. The generator 26 projects into this propelling chamber 46 if the piston 24 is in its initial position at the rear end 32 of the cylinder 22.

A tooth rack section 50 is formed in the piston 24, and that is in the area in which the teeth of the pinion 28 project into the cylinder 22. The tooth rack section 50 is segmented, with a first section 50a being formed by a first segment 52. The first segment 52 is formed in one piece with the piston 24 at the lower end 42 of the piston 24. A second section 50b consists preferably of several segments 54 which are detachably attached to the piston 24. For a good transmission of force the piston toothing is preferably designed such that the pinion 28 is in contact with the toothing at the reference circle at least over 11 mm, preferably over a width of 14 mm. The tooth rack section 50 preferably extends over the entire length of the piston 24, in order to permit a long effective tensioning length in that the tooth rack section 50 leaves the toothing of the pinion completely. A sealing ring may be integrated into the last tooth of the tooth rack section 50 to seal the piston 24 with respect to the cylinder wall.

Figure 3:
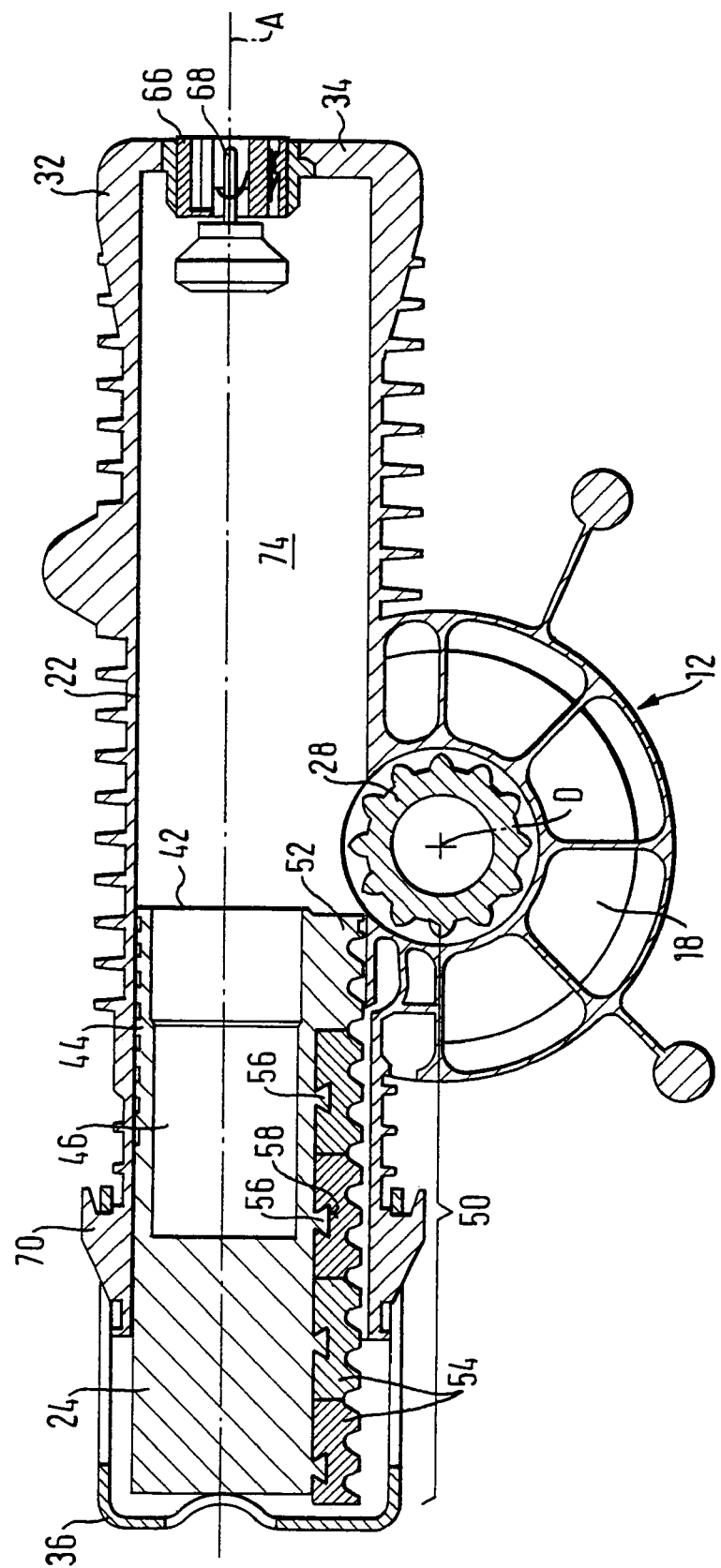
FIG. 3 shows a longitudinal section through the belt retractor of FIG. 1 in a second state.

This detachable attachment is advantageously implemented in that, as is illustrated in FIGS. 1 and 3, shearing pins 56 are formed on the piston 24, which reach into recesses 58 in the segments 54. The advantage of this detachable attachment will be apparent from the description of the manner of operation of the tensioning device 12 following further below.

The gas generator 26 comprises a sleeve 60 which accommodates a propellant charge 62 having an igniter 64 and which is closed with a base 66. The gas generator 26 is located with its base 66 in an opening at the rear end 32 of the cylinder 22, with an electric plug connection 68 being provided in the base 66 to connect the gas generator 26 to an activating device which is not shown.

In the initial state, as it is shown in FIG. 2, the piston 24 is located at the rear end 32 of the cylinder, abutting the end wall 34 with its lower end 42. Thus, the tube section 44 advantageously surrounds the gas generator 26, with a smaller overall length of the cylinder 22 resulting from this. As can be seen from the figures, the piston 24 is in the initial state in such a manner that the tooth rack section 50 is not yet engaged by the pinion. Therefore, in the initial state the belt reel 18 can rotate freely.

Figure 4:
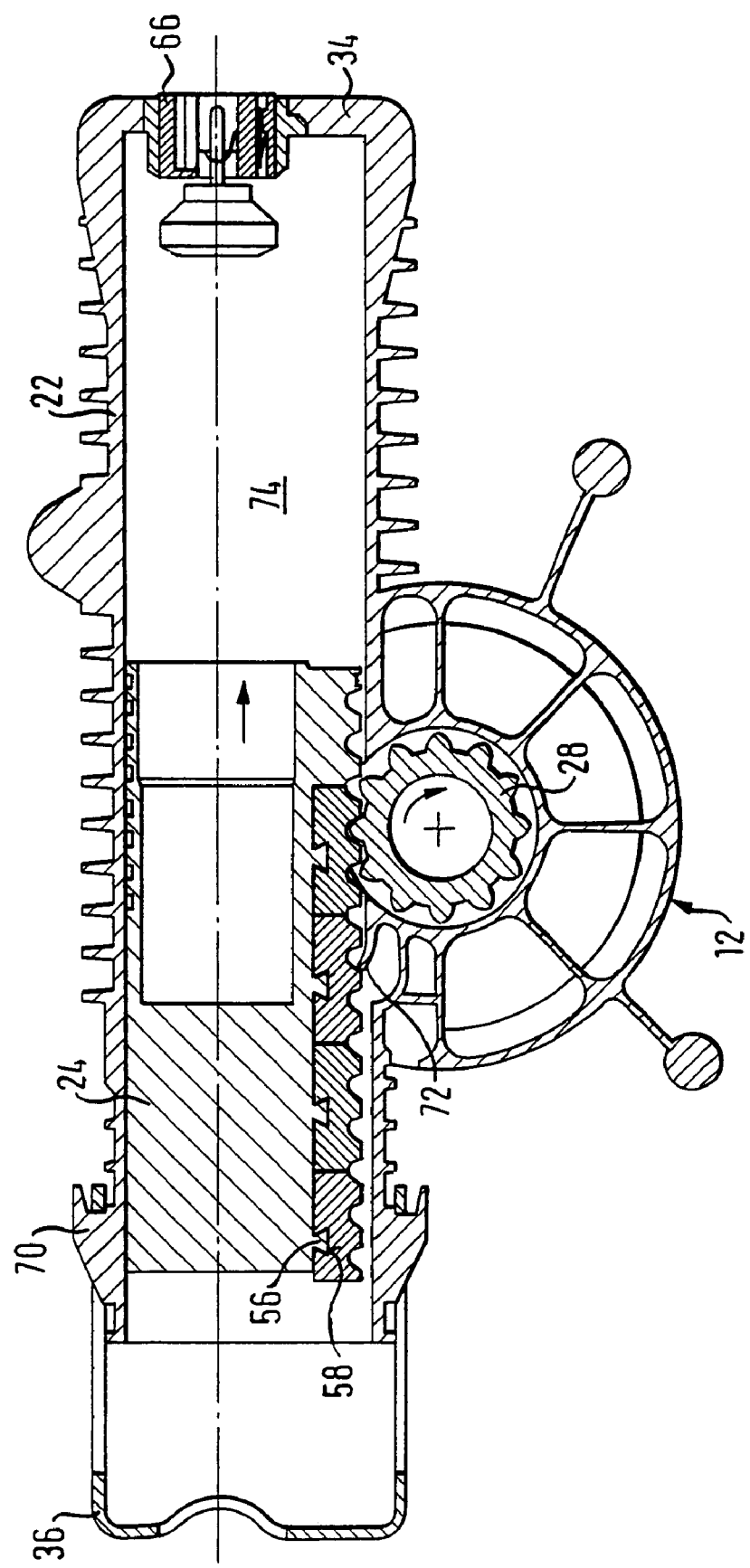
FIG. 4 shows a longitudinal section through the belt retractor of FIG. 1 in a third state.

In order to activate the tensioning device 12 the gas generator 26 is ignited. The developing pressurized gas propels the piston 24 towards the front end of the cylinder 22, the pinion 28 being entrained by the tooth rack section 50 and thus the belt reel 18 being driven in order to eliminate a possibly existing belt slack. If the piston 24 can reach the front end of the cylinder 22 it will be stopped by the braking device. For this purpose, the catching cap 36 can be pulled off the cylinder 22 under the expenditure of a force, caused by friction at the outer wall of the cylinder and/or by plastic deformation, to such an extent that it is arrested by catch hooks 70 formed at the outer wall of the cylinder (FIG. 4). In this manner the catching cap 36 can slow down the piston 24 by converting its kinetic energy. The telescope-like displacement of the catching cap 36 advantageously permits a long braking distance and thus a good braking function with a reduced overall length of the tensioning device.

As can be seen in FIG. 3, thanks to the displacement of the sleeve 36, the tooth rack section 50 has left the contact area of the pinion 28 so that the pinion can rotate freely again. On account of this, the angular momentum of the belt reel 18 can be utilized in that the belt reel 18 continues to rotate due to its mass moment of inertia and is able to retract belt webbing. This is advantageous in particular in case of a great slack in the safety belt, for which the tensioning length alone would not be sufficient. A further advantage of the free running of the pinion 28 results, for example, if the belt retractor is equipped with a belt force limitation which may be implemented in that between the belt reel 18 and a locking device for a vehicle-sensitive or belt-sensitive locking of the belt reel there is provided a torque rod (both not shown). Since in contrast to the belt tensioner the belt reel 18 is provided with a free running, a certain length of the belt webbing can be pulled off in spite of the response of the locking device 20 under torsion of the torque rod, which is imperative for the function of the belt force limitation. Moreover, the release of the pinion 28 advantageously means that after completion of the tensioning process the belt retractor 10 can only be blocked still by the locking device 20 so that a vehicle occupant may free himself, for example after a process of restraint, by the unwinding of belt webbing, when the locking device 20 releases the belt reel 18 again.

However, in case the piston 24 does not move through the entire tensioning length, for example because there was only a small slack in the safety belt, the tooth rack section 50 remains engaged by the pinion 28, as it is shown in FIG. 4. If the attempt is now made to unwind belt webbing, the piston 24 will have to be pushed back via the pinion 28. However, this is possible only to a certain extent since the space 74 of the cylinder is filled with pressurized gas between the lower end 42 of the piston 24 and the end wall 34 of the cylinder 22 and should preferably be closed tightly.

Up to now, this problem was solved in that a relief valve was provided in the piston or in the cylinder, through which the pressure could escape after a certain length of time. In the present invention, however, this is not necessary since the segments 54 are detachably attached to the piston. An elastic barb 72 at the inner wall of the cylinder prevents that segments 54 which are already out of engagement with the pinion 28 are entrained by the piston again during the return travel of the piston 24. These segments are rather retained by the barb 72. The shearing pins 56 are preferably dimensioned such that they can be shorn off by the forces occurring when unwinding the belt webbing, for example as a result of the beginning of the belt force limitation. On the other hand, the shearing pins are to be sufficiently sturdy that the segments 54 can overcome the friction on the cylinder wall, for example when assembling the piston 24. This means that the segments 54 are to be detachable from the piston 24 by the forces transmitted by the belt reel 18.

Figure 5:
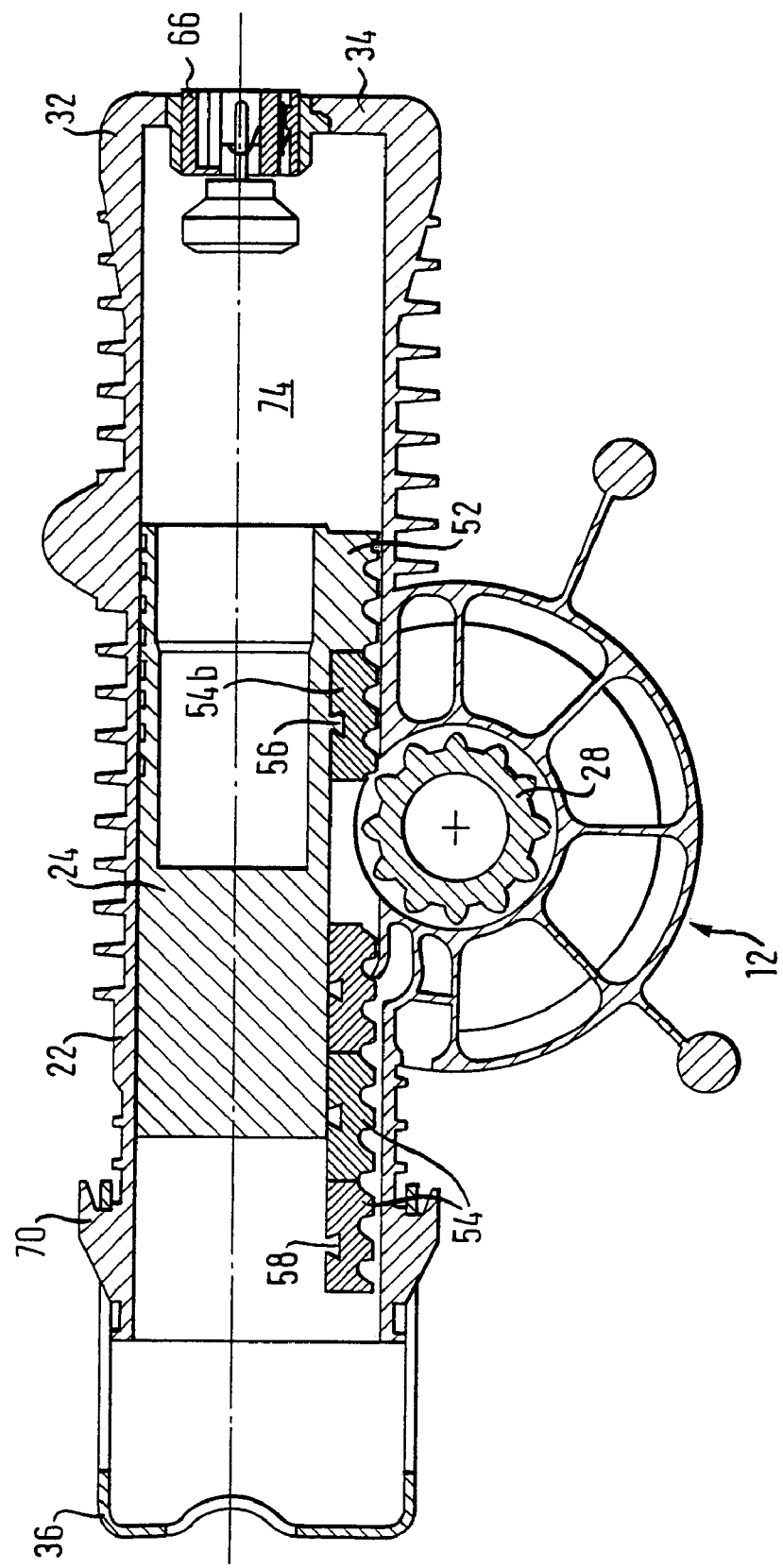
FIG. 5 shows a longitudinal section through the belt retractor of FIG. 1 in a fourth state.

As can be seen in FIG. 5, it is in this case the matter of three segments 54 which are located left of the pinion 28 while one segment 54b is still in engagement. During the return travel of the piston 24 the connection of the segments 54 to the piston 24 is then released in that the shearing pins 56 are shorn off. The piston 24 must therefore be moved back by the pinion 28 by a few teeth only, at most by so many as are located on the segment 54b which, at the time of the maximum advance movement, was still in contact with the pinion 28. The increase of pressure in the space 74 of the cylinder closed off by the piston 24 caused by this slight return movement is negligible so that there is no resistance worth mentioning to the unwinding of the belt webbing.

The housing 14 of the tensioning device 12, in particular the cylinder 22 and/or the piston 24, can advantageously be manufactured at low cost by diecasting or injection moulding. Advantageously, also the belt reel 18 and the pinion 28 can be manufactured preferably in one piece by diecasting. This is made possible by a piston 24 having, in comparison with the state of the art, a relatively large cross-section which can preferably be twice as large. If a piston 24 having a large cross-section is used, this piston can be driven with a lower gas pressure of below 400 bar, preferably of below 300 bar so that the strength of diecasting or injection moulding is sufficient. Moreover, such a design has the advantage that igniters or generators of synthetic material can be employed, which likewise mean a considerable benefit in costs. To ensure, nevertheless, a sufficient strength for the force transmission from the piston 24 to the pinion 28 the toothing of pinion and piston is designed to be wider than 11 mm, preferably wider than 14 mm. Moreover, the detachable segments 54 of the tooth rack section 50 and the pinion 28 can be manufactured preferably as profiled parts of a harder material.

The pinion 28 can advantageously be mounted in the housing 14 on both sides so that a bending moment exerted by the piston 24 on the axis D is taken up by the housing 14. The pinion 28 is advantageously provided with at least seven teeth so that as soon as it comes into contact with the tooth rack section 50 a blocking of the piston 24 on account of an unfavourable angular position of the pinion 28, in which a tooth encounters a tooth, is avoided. Moreover, the tooth rack section 50 comes into contact with the pinion 28 earlier so that the length of displacement of the piston can be utilized better.

In FIG. 6 an alternative design of a gas generator 26' for a belt retractor according to the invention can be seen. In this design the sleeve 60' is provided with a dividing wall 76'. Therefore, the sleeve 60' has a closed propellant charge chamber 78' for receiving the propellant charge 62'. Thus, the sleeve 60' can be filled with the propellant charge 62' already prior to the assembly of the gas generator 26' and can, nonetheless, be stored safely, which means for example that the propellant charge 62' is protected against humidity. The bottom of the sleeve 60' is formed by a bursting disk 80' which constitutes a protection against excess pressure for the gas generator 26'. Advantageously, the sleeve 60' can also be formed in one piece with the base 66' and/or the plug connector housing 68'.

In FIG. 7 a second embodiment of a belt retractor 110 is shown, in case of which reference numerals increased by 100 were used for components already known. This embodiment differs from the embodiment described before in that it comprises a piston 124 having an integrated gas generator 126. In this case the base 166, which carries the igniter 164, is located in the propelling chamber at the lower end 142 of the piston, which propelling chamber also accommodates the propellant charge 162. Thus, a sleeve for the gas generator 126 can be dispensed with. A protection against excess pressure for the gas generator 126 is provided as well, namely in the form of a fusible metal plug 182 and a bursting disk 180 forming the bottom of the sleeve 160. When the gas generator 126 is ignited the base 166 remains in the rear end 130 of the cylinder 122.

An alternative design of such a piston 124' is shown in FIG. 8. In this design, in contrast, the chamber 178' for the propellant charge is separated from the igniter 164' by a dividing wall 176'. The base 166' is inserted into the piston 124' and forms on its end opposite the plug connection 168' a sleeve with a stepped shoulder 186' which supports the dividing wall 176'.

In the described embodiments the cylinder and the piston are provided with a circular cross-section. However, the invention is not restricted to such cross-sections. Any round or angular cross-sections can be provided, which for example can advantageously offer a blockage against rotation of the piston about its longitudinal axis. The cylinder and the piston do not have to be straight but can also form an arc of a circle, by means of which a shortening of the overall length of the tensioning device can be achieved.

Alternatively or in addition to the retention of the tooth rack segments 54 by means of the barb 72 a collecting receptacle can also be provided at the end of the cylinder 22, in which tooth rack segments are collected as soon as they are detached from the piston 24.

The invention claimed is:

1. A belt retractor for a belt comprising a tensioning device having a cylinder and a piston displaceably guided in said cylinder, said piston being provided with a tooth rack section into which a pinion can engage to drive said belt retractor, wherein said tooth rack section comprises at least one toothed segment which is detachably attached to said piston and detaches from said piston to come out of engagement with said pinion after activation of said tensioning device.

2. The belt retractor according to claim 1, wherein said piston is manufactured by diecasting.

3. The belt retractor according to claim 1, wherein said detachable segment consists of another material than said remaining piston.

4. The belt retractor according to claim 1, wherein said tooth rack section comprises several detachable segments.

5. The belt retractor according to claim 1, wherein said pinion is manufactured by diecasting.

6. The belt retractor according to claim 1, wherein said pinion is manufactured in one piece with a belt reel.

7. The belt retractor according to claim 1, wherein said pinion comprises more than seven teeth.

8. The belt retractor according to claim 1, wherein said tensioning device comprises a housing, with said cylinder being manufactured in one piece with said diecast housing.

9. The belt retractor according to claim 1 wherein said at least one toothed segment detaches from said piston to come out of engagement with said pinion after activation of said tensioning device and in response to the piston being displaced a predetermined distance in said cylinder during unwinding of the belt.

10. The belt retractor according to claim 9 including a barb provided in said cylinder, wherein said barb engages said at least one toothed segment to allow said at least one toothed segment to detach from said piston upon said piston being displaced the predetermined distance in said cylinder during unwinding of the belt.

11. A belt retractor comprising a tensioning device having a cylinder and a piston displaceably guided in said cylinder, said piston being provided with a tooth rack section into which a pinion can engage to drive said belt retractor, wherein said tooth rack section comprises at least one segment which is detachably attached to said piston, wherein at least one shearing pin is provided on said piston, which shearing pin reaches into a recess in said detachable segment.

12. A belt retractor comprising a tensioning device having a cylinder and a piston displaceably guided in said cylinder, said piston being provided with a tooth rack section into which a pinion can engage to drive said belt retractor, wherein said tooth rack section comprises at least one segment which is detachably attached to said piston, wherein a barb is provided on an inner wall of said cylinder, which barb can engage said detachable segment.

* * * * *